(12) United States Patent
Lee

(10) Patent No.: US 6,960,060 B2
(45) Date of Patent: Nov. 1, 2005

(54) DUAL COOLANT TURBINE BLADE

(75) Inventor: Ching-Pang Lee, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 21 days.

(21) Appl. No.: 10/718,462

(22) Filed: Nov. 20, 2003

(65) Prior Publication Data

US 2005/0111976 A1 May 26, 2005

(51) Int. Cl.[7] ............................................. F04D 29/38
(52) U.S. Cl. ...................................... 415/115; 416/97 R
(58) Field of Search ............................... 415/115, 116; 416/90 R, 92, 97 R, 96 R

(56) References Cited

U.S. PATENT DOCUMENTS

| | | | |
|---|---|---|---|
| 4,102,603 A | 7/1978 | Smith et al. | 416/244 A |
| 5,134,844 A | 8/1992 | Lee et al. | 60/806 |
| 5,232,339 A | 8/1993 | Plemmons et al. | 415/178 |
| 5,320,485 A * | 6/1994 | Bourguignon et al. | 415/115 |
| 5,387,086 A | 2/1995 | Frey et al. | |
| 5,472,313 A | 12/1995 | Quinones et al. | 415/115 |
| 5,967,752 A | 10/1999 | Lee et al. | |
| 5,975,850 A | 11/1999 | Abuaf et al. | |
| 5,996,331 A | 12/1999 | Palmer | 60/782 |
| 6,126,396 A | 10/2000 | Doughty et al. | |
| 6,183,193 B1 | 2/2001 | Glasspoole et al. | 415/115 |
| 6,428,270 B1 * | 8/2002 | Leone et al. | 415/115 |
| 6,491,496 B2 * | 12/2002 | Starkweather | 416/97 R |
| 2001/0018024 A1 | 8/2001 | Eyde et al. | |
| 2002/0028140 A1 | 3/2002 | Jacala | |
| 2002/0119047 A1 | 8/2002 | Starkweather | |

OTHER PUBLICATIONS

CFM International, "CFM56–3 Engine Airflow," Engine in public use and on sale in U.S. more than one year before Oct. 1, 2003, one page color drawing.

U.S. Appl. No. (pending), "Triple Circuir Turbine Cooling," by Erich A. Krammer et al, filed concurrently herewith (Nov. 20, 2003,).

U.S. Appl. No. 10/718,149, "Triple Circuit Turbine Cooling," by Erich A. Krammer et al, filed concurrently herewith on Nov. 20, 2003 (Docket GE132280).

* cited by examiner

Primary Examiner—Edward K. Look
Assistant Examiner—Dwayne J. White
(74) Attorney, Agent, or Firm—William S. Andes; Francis L. Conte

(57) ABSTRACT

A turbine blade includes a hollow airfoil joined to a dovetail and platform. The airfoil includes leading and trailing edge cooling circuits disposed between the opposite pressure and suction sidewalls of the airfoil along the leading and trailing edges thereof. The leading edge cooling circuit includes a radial inlet commencing in the base of the dovetail, and the trailing edge cooling circuit includes an axial inlet commencing in the aft face of the dovetail for receiving coolant having different pressure and temperature.

20 Claims, 5 Drawing Sheets

DUAL COOLANT TURBINE BLADE

BACKGROUND OF THE INVENTION

The present invention relates generally to gas turbine engines, and, more specifically, to turbine cooling therein.

In a gas turbine engine air is pressurized in a compressor and mixed with fuel in a combustor for generating hot combustion gases. Multiple turbine stages follow the combustor for extracting energy from the combustion gases to power the compressor and produce useful work.

In a typical turbofan gas turbine engine configuration, a high pressure turbine (HPT) immediately follows the combustor for receiving the hottest combustion gases therefrom from which energy is extracted for powering the compressor. A low pressure turbine (LPT) follows the HPT and extracts additional energy from the combustion gases for powering a fan disposed upstream from the compressor for producing propulsion thrust for powering an aircraft in flight.

The HPT includes a turbine nozzle at the discharge end of the combustor which directs the combustion gases between first stage turbine rotor blades arranged in a row around the perimeter of a supporting rotor disk. The disk in turn is joined by a corresponding shaft to the rotor of the compressor for rotating the corresponding compressor blades therein.

The nozzle vanes and rotor blades have corresponding airfoil configurations specifically tailored for maximizing energy extraction from the hot combustion gases. The vanes and blades are hollow and include internal cooling circuits which typically use a portion of the compressor discharge pressure (CDP) air for cooling thereof. Since the nozzle vanes are stationary and the rotor blades rotate during operation, they typically have different internal cooling configurations, while similarly sharing various rows of film cooling holes through the pressure and suction sides thereof for providing external film cooling of the vanes and blades.

Any CDP air diverted from the combustion process decreases efficiency of the engine and should be minimized. However, sufficient cooling air must be used to limit the operating temperature of the vanes and blades for ensuring a suitable useful life thereof.

The turbine vanes and blades are typically manufactured from state-of-the-art superalloy materials, typically nickel or cobalt based, which have high strength at the elevated temperatures experienced in a modern gas turbine engine. The use of superalloy material and intricate cooling circuits in turbine vanes and blades helps minimize the requirement for diverting discharge air from the compressor for cooling thereof.

Furthermore, typical commercial aircraft have well defined operating cycles including takeoff, cruise, descent, and landing, with the engine being operated with a correspondingly short duration at maximum power or high turbine rotor inlet temperature.

In the continuing development of advanced gas turbine engines, it is desirable to operate the engine almost continuously at very high compressor discharge temperature and at correspondingly high turbine rotor inlet temperatures for extended periods of time for maximizing efficiency or performance. This type of engine may be used to advantage in small business jets or advanced military applications.

However, this long and hot operating condition presents extreme challenges in cooling the high pressure turbine rotor using the currently available superalloy disk materials. By operating the compressor for achieving high discharge pressure of the air used in the combustion process, the temperature of that high pressure air is correspondingly increased which decreases the ability of that CDP air to cool the high pressure turbine. Adequate cooling of the turbine is required for ensuring a long useful life thereof and to reduce the need for periodic maintenance.

Energy extraction from the HPT is typically effected by reaction in the turbine blades. The pressure of the combustion gases drops substantially between the leading and trailing edges of the blades and affects performance of the blade cooling circuits.

For example, a suitable backflow margin must be maintained between the pressure of the cooling air inside the airfoil and the pressure of the combustion gases outside the airfoil to prevent backflow or ingestion of the hot combustion gases into the airfoils.

Since compressor discharge air is typically used for cooling the HPT blades, the pressure of the compressor discharge air is suitably greater than the pressure of the combustion gases around the blades and therefore maintains sufficient backflow margin. However, as the pressure of the combustion gases decreases towards the trailing edge of the blades, the corresponding backflow margin increases.

Excessive backflow margins lead to undesirable blow-off or lift-off of the cooling air discharged through the various film cooling holes found in turbine blades. And, excess backflow margins also increase the flowrate of the cooling air discharged through the holes which reduces engine efficiency.

Accordingly, it is desired to provide a turbine blade having an improved cooling configuration for better utilizing the limited pressurized air available from the compressor.

BRIEF DESCRIPTION OF THE INVENTION

A turbine blade includes a hollow airfoil joined to a dovetail and platform. The airfoil includes leading and trailing edge cooling circuits disposed between the opposite pressure and suction sidewalls of the airfoil along the leading and trailing edges thereof. The leading edge cooling circuit includes a radial inlet commencing in the base of the dovetail, and the trailing edge cooling circuit includes an axial inlet commencing in the aft face of the dovetail for receiving coolant having different pressure and temperature.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
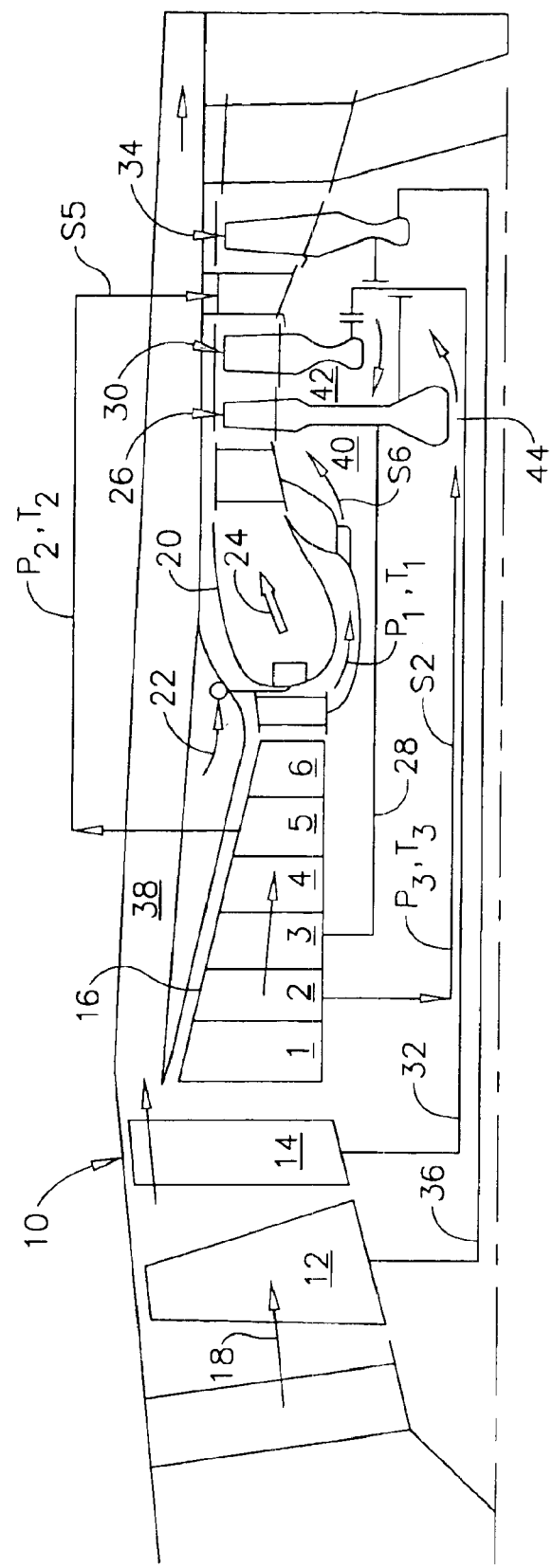
FIG. 1 is an axial schematic view of an exemplary multi-rotor turbofan aircraft engine.

Illustrated in FIG. 1 is a turbofan gas turbine engine 10 having an exemplary configuration for powering an aircraft in flight. The engine is axisymmetrical about a longitudinal or axial centerline axis and includes a first or forward fan 12, a second or aft fan 14, and a multistage axial compressor 16 joined together in serial flow communication for pressurizing air 18.

These components may have any conventional configuration, with the first and second fans including corresponding rows of fan blades extending radially outwardly from supporting rotor disks. The axial compressor includes various stages, such as the exemplary six stages 1–6 shown, including corresponding rows of rotor blades extending radially outwardly from corresponding interconnected rotor disks, cooperating with corresponding rows of stator vanes.

An annular combustor 20 is disposed at the discharge end of the compressor 16 for mixing fuel 22 with the pressurized air to form hot combustion gases 24.

A first or high pressure turbine 26 directly follows the combustor for receiving the hottest combustion gases therefrom, and is joined by a first shaft 28 to the compressor 16 for driving the rotor thereof during operation.

A second or intermediate power turbine 30 follows the first turbine 26 for receiving the combustion gases therefrom, and is joined to the second fan 14 by a second shaft 32.

A third or low pressure turbine 34 follows the second turbine 30 for receiving the combustion gases therefrom, and is joined to the first fan 12 by a third shaft 36.

The three turbines 26,30,34 are independently rotatable by their corresponding rotors or shafts 28,32,36 and define a three spool engine in which the two-stage fan 12,14 and compressor pressurize the ambient air in turn during operation. An annular bypass duct 38 surrounds the core engine aft of the two fans in a typical turbofan configuration for producing a majority of the propulsion thrust from the fan air bypassing the core engine.

In order to effectively cool the high pressure turbine 26, three independent cooling supply circuits 40,42,44 are used. The first supply circuit 40 is joined to the discharge end of the compressor for providing means for channeling first-pressure air, which is the last or sixth stage CDP air S6 of the compressor to the upstream or forward side of the high pressure turbine 26.

The second supply circuit 42 is joined to an intermediate stage, such as the fifth stage 5, of the compressor for providing means for channeling second-pressure air S5 to the aft or downstream side of the high pressure turbine 26.

And, the third supply circuit 44 is joined to another intermediate stage, such as the second stage 2, of the compressor 16 for providing means for channeling third-pressure air S2 through the center of the turbine 26 for locally cooling this region.

The third, second, and first supply circuits 44,42,40 are suitably joined in flow communication to sequential stages of the compressor 16 for extracting or bleeding therefrom the third-pressure air S2, the second-pressure air S5, and the first-pressure air S6 at correspondingly increasing pressure, and temperature. Both pressure and temperature of the air 18 increase as the air is pressurized through the stages of the compressor, with the second stage air having a third pressure P3 and temperature T3; the fifth stage air having a second pressure P2 and temperature T2; and the sixth stage CDP air having a first pressure P1 and temperature T1, which increase from stage to stage.

The three supply circuits are configured for differently cooling the different portion of the high pressure turbine 26 using the different cooling capabilities of the three different temperatures associated with the three different bleed streams, and additionally using the three different pressures associated therewith in the different pressure regions of the turbine.

Figure 2:
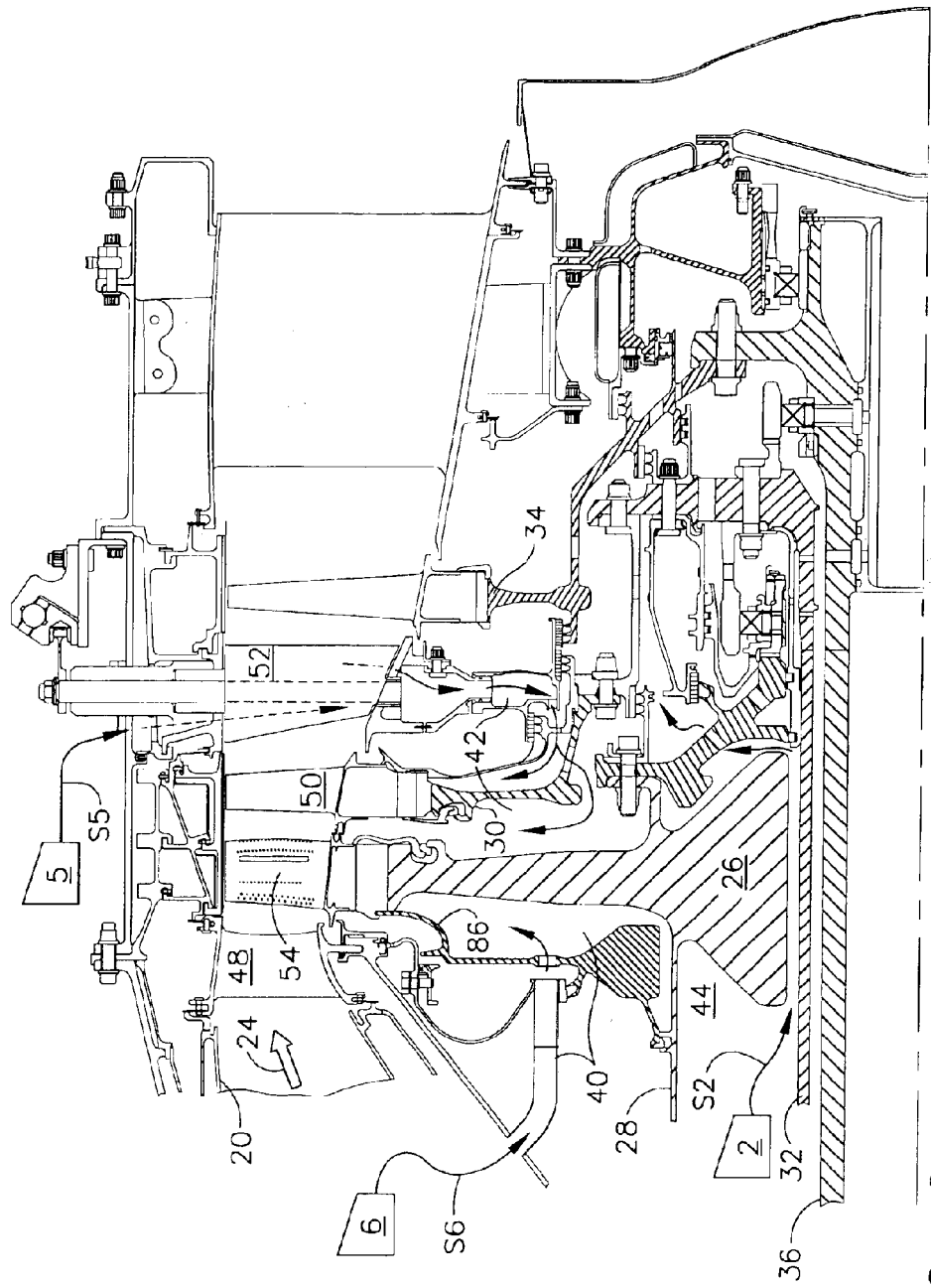
FIG. 2 is an enlarged, axial sectional view of the turbine region of the engine illustrated in FIG. 1.
Figure 3:
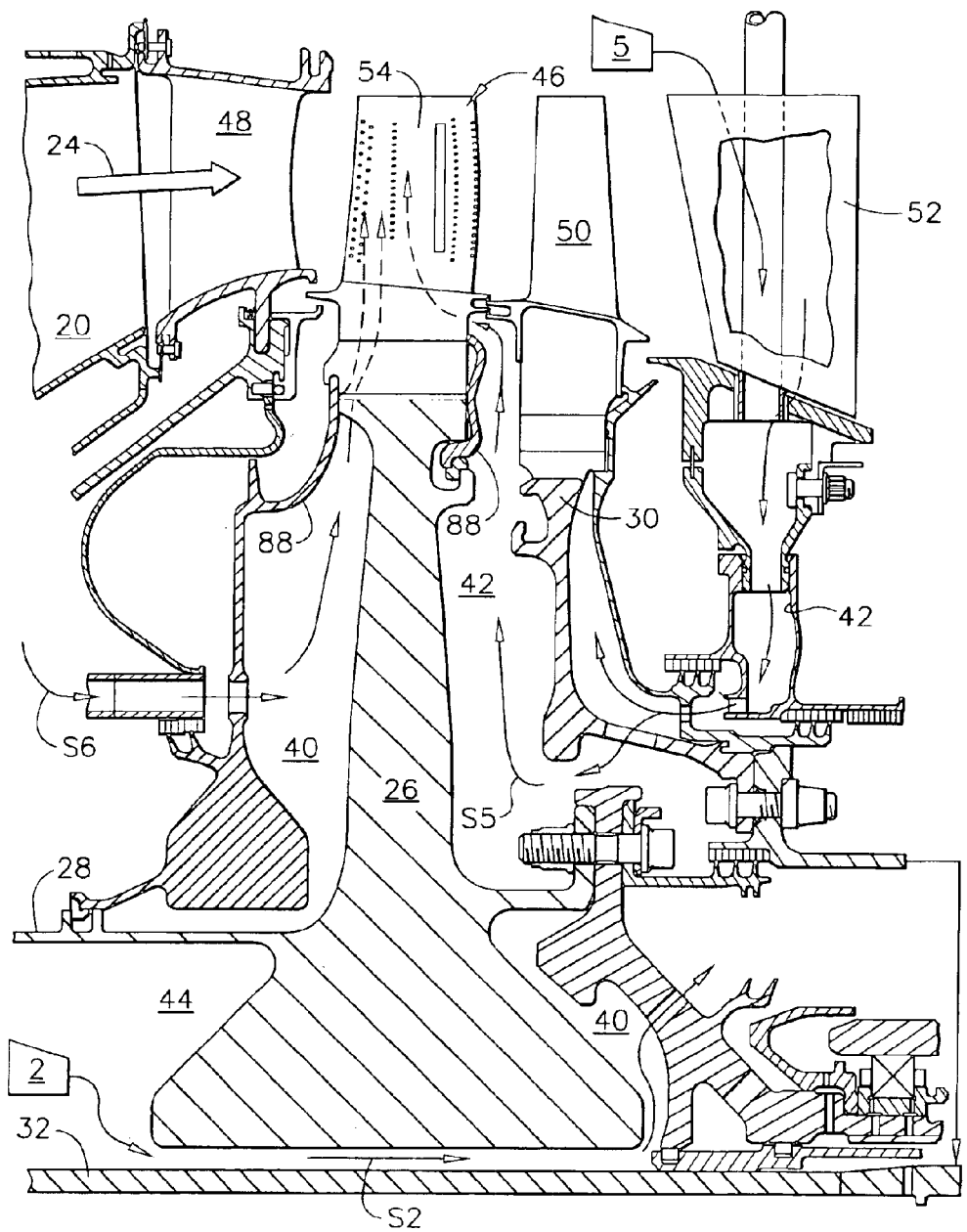
FIG. 3 is a further enlarged, axial sectional view of the turbine region illustrated in FIG. 2.

More specifically, the first turbine is illustrated in more detail in FIGS. 2 and 3 and comprises a first rotor disk 26 having forward and aft sides or faces extending radially inwardly from the perimeter rim to a thinner web terminating in a larger central hub. The hub includes a center bore, and a row of first stage turbine rotor blades 46 extends radially outwardly from the rim of the turbine disk.

The first supply circuit 40 is suitably configured from the compressor to extend radially outwardly along the forward side of the first disk 26. The second supply circuit 42 is suitably configured to extend radially outwardly along the aft side of the first disk 26. And, the third supply circuit 44 is suitably configured to extend through the bore of the first turbine.

In this way, the coolest extracted air S2 is used for cooling the bore and large hub of the first turbine rotor disk 26; the next coolest extracted air S5 is used for cooling the aft face of the first turbine disk 26 below the first blades thereon; and, the highest temperature CDP air S6 is used for cooling the forward face of the first stage turbine rotor disk 26 below the blades 46 supported thereon.

As shown in FIG. 3, the row of HPT or first rotor blades 46 extends radially outwardly from the perimeter of the first turbine disk 26 for cooperating with the stator vanes 48 of the HPT nozzle for extracting energy from the combustion gases 24 during operation.

Correspondingly, a row of intermediate pressure turbine (IPT) or second rotor blades 50 extends radially outwardly from the perimeter of the second turbine disk 30 for extracting additional energy from the combustion gases to power the second shaft 32 in counterrotation with the first shaft 28 powered by the first blades 46.

A variable area LPT nozzle 52 then channels the combustion gases to the corresponding rotor blades extending radially outwardly from the third turbine disk 34 illustrated in FIG. 2 for powering the third shaft 36 in counterrotation with the second shaft 32.

The three supply circuits 40,42,44 described above permit the use of three different sources of cooling air or coolant for preferentially cooling the different portions of the HPT, including its rotating components. The compressor discharge air coolant S6 is channeled through the first circuit 40 to cool the forward face of the rotor disk. The fifth stage bleed air coolant S5 is channeled through the second circuit 42 for cooling the aft face of the first turbine disk 26; and the second stage bleed air coolant S2 is channeled through the third circuit 44 for cooling the bore region of the first turbine disk 26.

The multiple coolant supply circuits for the HPT are examples of different flowpaths that may be used with multiple internal cooling circuits in the rotor blades 46 for better utilizing the different pressure and temperature sources of air available in the compressor.

Figure 4:
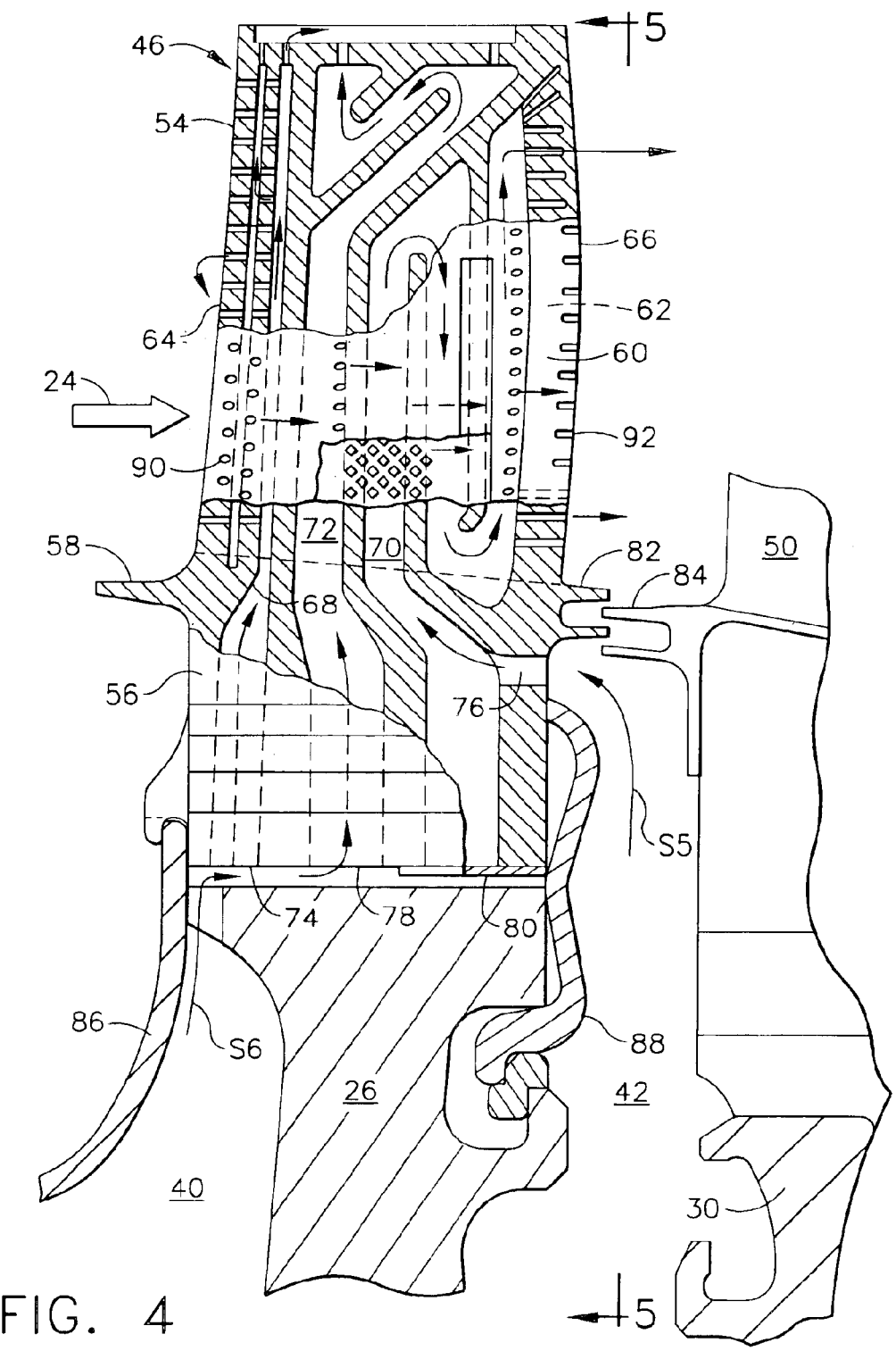
FIG. 4 is a partly sectional, enlarged axial view of the HPT turbine blade illustrated in FIG. 3 having multiple cooling circuits and inlets therein.

FIG. 4 illustrates an exemplary embodiment of the HPT rotor blades 46, each of which includes a hollow airfoil 54 integrally joined to a supporting dovetail 56 at a flow boundary platform 58 therebetween.

Figure 5:
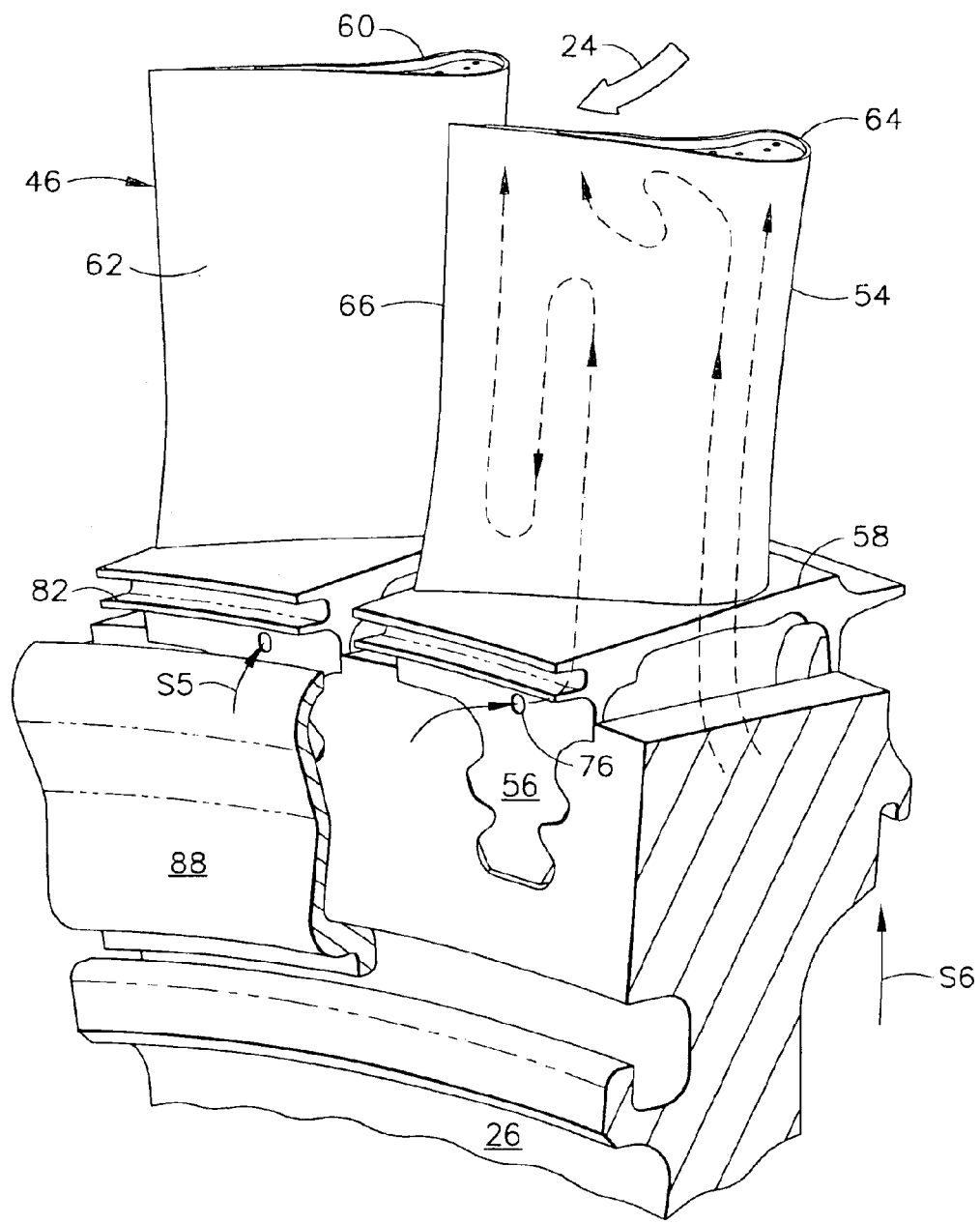
FIG. 5 is an isometric end-view of a portion of the turbine illustrated in FIG. 4 and taken generally along line 5—5, aft-facing-forward.

As additionally illustrated in FIG. 5, each airfoil includes circumferentially opposite pressure and suction sidewalls 60,62 joined together at axially or chordally opposite leading and trailing edges 64,66. The pressure sidewall is generally concave and the suction sidewall is generally convex, and both sidewalls extend in radial span between a root of the airfoil at the platform and a radially outer tip or distal end.

In the exemplary embodiment illustrated in FIG. 4 the airfoil 54 includes three independent cooling circuits 68,70, 72 extending in radial span therein. The first or leading edge circuit 68 is disposed directly behind the leading edge 64,.and includes a radial first coolant inlet 74 commencing in the inner surface of the base of the dovetail 56. The second or trailing edge circuit 70 is disposed in front of the trailing edge 66, and includes an axial second coolant inlet 76 commencing in the aft face of the dovetail. And, the third or middle circuit 72 is disposed axially between the two circuits 68,70, and includes a radial third coolant inlet 78 also commencing in the dovetail base, and between the first and second inlets 74,76.

The internal cooling circuits 68,70,72 of the airfoil may have any conventional configuration, with the leading edge circuit shown in FIG. 4 configured in two radial channels with impingement holes through a cold bridge therebetween for impingement cooling the back side of the leading edge prior to discharge through one or more rows of film cooling holes extending therethrough.

The trailing edge cooling circuit 70 illustrated in FIG. 4 is three-pass serpentine circuit which discharges the coolant therein through a row of trailing edge outlet holes, and film cooling holes in the sidewalls as desired.

The middle cooling circuit 72 is another form of serpentine circuit disposed directly below the airfoil tip for providing enhance cooling thereof, with outlet holes being provided in the floor of the tip cavity.

As indicated above, the combustion gases 24 channeled between the turbine blades illustrated in FIG. 5 lose substantial pressure as energy is extracted therefrom. Preferably, the aerodynamic profiles of the airfoils 46 effect relatively large reaction and large pressure drop or pressure ratio on the order of about 3.5 between the leading and trailing edges of the blades.

Accordingly, the pressure and temperature of the combustion gases near the stagnation region in front of the blade leading edge is close to maximum, whereas the pressure and temperature of the combustion gases along the blade trailing edge are substantially reduced.

The first supply circuit 40 illustrated in end part in FIG. 4 may be used in a conventional manner for providing the CDP or sixth stage air coolant to the first and third inlets 74,78 of the first turbine blades 46 for supplying the corresponding leading edge and middle internal cooling circuits 68,72 thereof with high pressure air.

Correspondingly, the second supply circuit 42 shown in end part in FIG. 4 may be used for providing the fifth stage, lower pressure bleed air to the trailing edge cooling circuit 70 in the first blades 46.

In this way, high pressure coolant is provided to the leading edge portion of each rotor blade to provide a suitable backflow margin with the high pressure combustion gases outside thereof. And, lower pressure coolant is provided in the trailing edge region of each blade for providing a corresponding backflow margin with the lower pressure combustion gases outside thereof. Furthermore, the bleed air provided in the trailing edge cooling circuit 70 is substantially cooler than the CDP air provided in the remaining blade circuits and permits improved cooling of the individual blades, or a corresponding reduction in the need for cooling air bled from the compressor.

The several cooling circuits provided inside each of the blades illustrated in FIG. 4 may be manufactured in a conventional manner, such as by casting. In this process, each of the circuits includes a corresponding leg extending radially through the supporting dovetail 56 which legs are open along the lower surface of the dovetail base. In this way, the two inlets 74,78 are defined in the base of the dovetail and receive the cooling air from the small space provided between the dovetail and the bottom of the axial dovetail slot formed in the perimeter rim of the turbine disk 26.

Although the second cooling circuit 70 initially extends through the dovetail to its base due to the exemplary casting method, it is then suitably sealed closed at the base by an imperforate plate 80 fixedly joined thereto, by brazing for example. The second inlet 76 is located suitably above the corresponding lobes of the dovetail 56 and provides a side inlet into the trailing edge circuit 70 remote from the dovetail slot. In an alternate embodiment, the lower end of the trailing edge circuit 70 may be cast solid in the dovetail eliminating the need for the plate 50, with the side inlet 76 providing the initial portion of the circuit as a originally cast.

Since the side inlet 76 is remote from the dovetail slot in the perimeter of the rotor disk 26 to isolate the trailing edge circuit from the remaining circuits of the airfoil, each blade further includes a suitable sealing wing 82 extending aft from the platform 58 as illustrated in FIG. 4. The sealing wing 82 may have the conventional form of a pair of such wings defining angel wings or labyrinth seals disposed immediately above the side inlet 76 in each blade for directing the coolant flow into the second inlet during operation.

Correspondingly, each of the IPT rotor blades 50, illustrated in part in FIG. 4, includes a pair of cooperating sealing wings 84 extending forward from: the respective platforms thereof to effect the rotary or labyrinth seal with the first sealing wings 82 on the first turbine rotor blades.

The dual coolant turbine blades 46 illustrated in FIGS. 3 and 4 are suitably mounted in the perimeter rim of the first turbine disk 26 to cooperate with the different first and second supply circuits 40,42 provided on the opposite faces thereof. The first turbine disk 26 is preferably solid for maximizing its strength under high rotary speed, and under the correspondingly severe operation of the engine with high compressor discharge temperature and high turbine rotor inlet temperature for maximizing engine efficiency. The first turbine disk 26 has a wide perimeter rim matching the length of the dovetails, and decreases in thickness along a thinner web which terminates in a thicker hub having a central bore through which the turbine rotor shafts 32,36 extend.

Correspondingly, the HPT further includes a forward blade retainer 86 of the boltless design which utilizes a perimeter bayonet mount for locking the blade retainer in a corresponding overhang in the forward face of the disk rim.

An annular aft blade retainer 88 is mounted on the aft side of the disk rim to axially trap therebetween the blade dovetails 56 of the full row of turbine rotor blades. The aft blade retainer 88 may also have a conventional, boltless configuration which is suitably trapped to the aft face of the disk rim.

The forward retainer 86 illustrated in FIG. 4 seals closed the forward ends of the dovetail slots in the disk rim, with the rim including a row of castellated radial slots which terminate the first supply circuit 40 channeling the coolant into the dovetail slots. The aft blade retainer 88 illustrated in FIG. 4 seals closed the aft ends of the dovetail slots around the disk rim to confine flow of the compressor discharge air S6 into the dovetail slot for flow through the two inlets 74,78.

In contrast, the trailing edge cooling circuits 70 receive their louver pressure and lower temperature bleed air S5 from the discharge end of the second supply circuit 42 that flows outside the aft blade retainer 88 which terminates short of both the side inlet 76 and the sealing wings 82,84.

As best illustrated in FIG. 3, the forward blade retainer 86 is spaced axially forward from the web of the first turbine disk 26 to provide the outlet end of the first supply circuit 40 which channels the high pressure CDP air to the forward ends of the dovetail slots for flow into the first and third inlets 74,78.

Correspondingly, the second turbine disk 30 is spaced aft from the first turbine disk 26 to form an aft cavity therebetween defining the discharge end of the second supply circuit 42. The fifth stage bleed air is channeled during operation in this aft cavity along the aft face of the first turbine disk 26 for cooling thereof, followed in turn by delivery into the second inlet 76 of the blades for then cooling the trailing edge regions thereof.

As shown in FIGS. 1 and 2, the first supply circuit 40 is suitably configured to define a first means for channeling the compressor discharge air S6 through the forward blade retainer 86 for flow through the first coolant inlet 74 in the row of first stage turbine rotor blades. Correspondingly, the second supply circuit 42 is configured to provide second means for channeling the compressor interstage bleed air S5 to the aft cavity between the first and second turbines 26,30 for flow through the row of second coolant inlets 76 in the first stage blades.

The first supply circuit 40 may have any conventional configuration for channeling the compressor discharge air around the combustor 20 and through a corresponding inducer which accelerates the air from the stationary members to the rotating forward blade retainer 86 during operation.

The second supply circuit 42 provides a suitable cooling circuit outside the combustor which channels the fifth stage bleed air radially inwardly through the hollow vanes of the LPT nozzle, and through a suitable inducer for accelerating the air through the rotating second turbine disk 30. In this way, the pressure and temperature of the fifth stage bleed air remain relatively low when provided to the discharge end of the second supply circuit 42 for flow into the row of first stage turbine rotor blades.

The leading edge cooling circuit 68 illustrated in FIG. 4 includes one or more row of film cooling outlet holes 90 adjacent the airfoil leading edge 64 which discharge the spent coolant with a first backflow margin. This backflow margin represents the pressure ratio of the compressor discharge air inside the airfoil relative to the pressure of the combustion gases 24 outside the airfoil along the leading edge.

Correspondingly, the trailing edge cooling circuit 70 includes a row of trailing edge outlet holes 92 along the airfoil trailing edge 66 for discharging the fifth stage bleed air with a corresponding second backflow margin. This backflow margin is the ratio of the pressure of the bleed air inside the airfoil relative to the pressure of the combustion gases outside the airfoil along the trailing edge.

Notwithstanding the substantial pressure loss in the combustion gases as they flow over the first stage rotor blades during operation, the two backflow margins near the leading and trailing edges of the airfoils may remain within the ratio of about 1.5 for preventing excess backflow which could cause undesirable blow-off or lift-off of the air discharged from the airfoil as film cooling air.

As indicated above, the particular configurations of the three cooling circuits 68,70,72 in the first stage turbine rotor blades may be conventional with internal turbulators (not shown) in the circuits and various rows of film cooling and other discharge holes through the sidewalls of the airfoils.

The leading edge cooling circuit 68 illustrated in FIG. 4 discharges its spent cooling air through various rows of film cooling holes, as well as holes in the tip cavity.

The trailing edge cooling circuit 70 discharges its spent cooling air through rows of film cooling holes and trailing edge centerline and pressure side outlet holes.

And, the middle cooling circuit 72 discharges its spent cooling air through tip holes, film cooling holes in the sidewalls, and through an array or bank of turbulator pins sharing a common radial outlet slot in the pressure side of the airfoil.

Accordingly, the backflow margins of the various cooling circuits may be tailored due to the different pressures and losses in the air channeled through the various circuits, with the different pressure coolants provided through the first and third inlets 74,78 and the second inlet 76 being used to additional advantage in cooling the turbine blades.

The ability to use both interstage bleed air and compressor discharge air in cooling the first stage turbine rotor blades substantially improves the cooling performance of the first stage turbine rotor blades. The interstage bleed air is substantially cooler than the compressor discharge air, and the combination cooling of these dual coolant airstreams may be used for increasing the efficiency of the engine.

Accordingly, the engine may be operated with higher compressor discharge temperature and higher turbine rotor inlet temperature for extended periods of time due to the improved cooling of the dual coolant airstreams provided to the first stage rotor blades.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A turbine blade comprising:
    a hollow airfoil joined to a supporting dovetail at a platform;
    said airfoil including pressure and suction sidewalls joined together at chordally opposite leading and trailing edges, and extending in span between a root at said platform and an outer tip; and
    said airfoil further including a leading edge cooling circuit behind said leading edge having a radial first coolant inlet commencing in the base of said dovetail, a trailing edge cooling circuit in front of said trailing edge having an axial second coolant inlet commencing in the aft face of said dovetail, and a middle cooling circuit disposed between said leading edge circuit and trailing edge circuit, and having a radial third coolant inlet commencing in said dovetail base between said first and second inlets.

2. A blade according to claim 1 further comprising a sealing wing extending aft from said platform above said second inlet for directing coolant flow into said second inlet.

3. A blade according to claim 2 wherein said dovetail is sealed closed at said base below said second inlet and aft of said first inlet in said base.

4. A blade according to claim 3 wherein said second cooling circuit extends through said dovetail to said base and is sealed closed at said base by a plate fixedly joined to said base.

5. A blade according to claim 3 in combination with a rotor disk having a dovetail slot in a perimeter rim thereof in which said blade dovetail is mounted for defining a turbine;

said turbine further including a forward blade retainer mounted on a forward side of said disk rim, and an aft blade retainer mounted on an aft side of said disk rim to trap axially therebetween said blade dovetail; and said aft retainer terminates below said second inlet.

6. A turbine according to claim 5 wherein:

said disk further includes a thinner web extending radially inwardly from said rim to a thicker hub having a center bore;

said forward retainer is spaced from said web to channel a first-pressure coolant to said dovetail slot for flow into said dovetail first inlet; and said aft retainer seals closed said dovetail slot along said disk rim to contain said first-pressure coolant inside said dovetail slot.

7. A turbine according to claim 6 defining a first turbine in combination with a second turbine spaced aft from said first turbine to form an aft cavity therebetween for channeling a second-pressure coolant along an aft face of said first turbine disk to said second inlet.

8. A turbine combination according to claim 7 wherein:

said second turbine includes a row of second rotor blades extending outwardly from a rim of a second rotor disk; and said second rotor blades include a sealing wing extending forward to effect a rotary seal with said sealing wing on said first turbine rotor blade.

9. A turbine combination according to claim 8 further comprising:

first means for channeling compressor discharge air through said forward blade retainer for flow through said first coolant inlet; and second means for channeling compressor interstage bleed air to said aft cavity between said first and second turbines for flow through said second coolant inlet.

10. A turbine combination according to claim 9 wherein:

said leading edge cooling circuit includes a row of film cooling outlet holes adjacent said airfoil leading edge for discharging said compressor discharge air with a first backflow margin;

said trailing edge cooling circuit includes a row of trailing edge outlet holes adjacent said trailing edge for discharging said bleed air with a second backflow margin; and said two backflow margins are within about 1.5.

11. A turbine blade comprising:

a hollow airfoil joined to a supporting dovetail at a platform;

said airfoil including pressure and suction sidewalls joined together at chordally opposite leading and trailing edges, and extending in span between a root at said platform and an outer tip; and said airfoil further including a leading edge cooling circuit behind said leading edge having a radial first coolant inlet commencing in the base of said dovetail, and a trailing edge cooling circuit in front of said trailing edge having an axial second coolant inlet commencing in the aft face of said dovetail.

12. A blade according to claim 11 wherein said dovetail is sealed closed at said base below said second inlet and aft of said first inlet in said base.

13. A blade according to claim 12 further comprising a sealing wing extending aft from said platform above said second inlet for directing coolant flow into said second inlet.

14. A blade according to claim 13 wherein said airfoil further comprises a middle cooling circuit disposed between said leading and trailing edge circuits having a radial third coolant inlet commencing in said dovetail base between said first and second inlets.

15. A blade according to claim 13 in combination with a rotor disk having a dovetail slot in a perimeter rim thereof in which said blade dovetail is mounted for defining a turbine;

said turbine further including a forward blade retainer mounted on a forward side of said disk rim, and an aft blade retainer mounted on an aft side of said disk rim to trap axially therebetween said blade dovetail; and said aft retainer terminates below said second inlet.

16. A blade according to claim 15 wherein:

said disk further includes a thinner web extending radially inwardly from said rim to a thicker hub having a center bore;

said forward retainer is spaced from said web to channel a first-pressure coolant to said dovetail slot for flow into said dovetail first inlet; and said aft retainer seals closed said dovetail slot along said disk rim to contain said first-pressure coolant inside said dovetail slot.

17. A blade according to claim 16 defining a first turbine in combination with a second turbine spaced aft from said first turbine to form an aft cavity therebetween for channeling a second-pressure coolant along an aft face of said first turbine disk to said second inlet.

18. A turbine combination according to claim 17 wherein:

said second turbine includes a row of second rotor blades extending outwardly from a rim of a second rotor disk; and said second rotor blades include a sealing wing 84 extending forward to effect a rotary seal with said sealing wing on said first turbine rotor blade.

19. A turbine combination according to claim 17 further comprising:

first means for channeling compressor discharge air through said forward blade retainer for flow through said first coolant inlet; and second means for channeling compressor interstage bleed air to said aft cavity between said first and second turbines for flow through said second coolant inlet.

20. A turbine combination according to claim 19 wherein:

said leading edge cooling circuit includes a row of film cooling outlet holes adjacent said airfoil leading edge for discharging said compressor discharge air with a first backflow margin;

said trailing edge cooling circuit includes a row of trailing edge outlet holes adjacent said trailing edge for discharging said bleed air with a second backflow margin; and said two backflow margins are within about 1.5.

* * * * *